United States Patent
Robles et al.

(10) Patent No.: US 9,567,109 B2
(45) Date of Patent: Feb. 14, 2017

(54) SPACE STRUCTURE DEPLOYMENT SYSTEM

(71) Applicant: The Boeing Company, Chicago, IL (US)

(72) Inventors: Thomas E. Robles, Fullerton, CA (US); Trevor Scott Howard, Hermosa Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 140 days.

(21) Appl. No.: 14/488,902

(22) Filed: Sep. 17, 2014

(65) Prior Publication Data
US 2016/0075452 A1    Mar. 17, 2016

(51) Int. Cl.
| | | |
|---|---|---|
| B64G 1/64 | (2006.01) | |
| B64G 1/00 | (2006.01) | |
| B64G 1/10 | (2006.01) | |
| B64G 1/22 | (2006.01) | |

(52) U.S. Cl.
CPC .............. *B64G 1/005* (2013.01); *B64G 1/10* (2013.01); *B64G 1/64* (2013.01); *B64G 1/641* (2013.01); *B64G 2001/228* (2013.01)

(58) Field of Classification Search
CPC ............. B64G 1/002; B64G 1/10; B64G 1/64; B64G 1/641; B64G 1/646; B64F 1/04; B64F 1/10; B64F 2201/08; B64F 2201/082; B64F 2201/088
See application file for complete search history.

(56) References Cited

U.S. PATENT DOCUMENTS

| | | | | |
|---|---|---|---|---|
| 4,441,674 A * | 4/1984 | Holtrop | ............... | B64D 1/06 244/137.4 |
| 5,904,323 A * | 5/1999 | Jakubowski, Jr. | ....... | B64D 7/08 244/137.4 |
| 6,126,115 A * | 10/2000 | Carrier | ................. | B64G 1/641 244/137.4 |
| 7,083,148 B2 * | 8/2006 | Bajuyo et al. | .......... | B64D 1/04 244/137.4 |
| 7,195,206 B2 * | 3/2007 | Kerstein | ................. | B64G 4/00 244/158.1 |
| 7,543,779 B1 * | 6/2009 | Lewis et al. | ........... | B64G 1/646 244/159.4 |
| 7,644,891 B2 * | 1/2010 | Aston et al. | ........... | B64G 1/641 244/137.4 |

(Continued)

OTHER PUBLICATIONS

Rossoni et al., "Deployment Mechanism for the Space Technology 5 Micro Satellite," Proceedings of the 37th Aerospace Mechanisms Symposium, Johnson Space Center, May 2004, 14 pages.

*Primary Examiner* — Christopher P Ellis
*Assistant Examiner* — Michael Wang
(74) *Attorney, Agent, or Firm* — Yee & Associates, P.C.

(57) ABSTRACT

A method and apparatus for deploying a space structure. The space structure is secured to a base with release mechanisms that engage features of the space structure when the base is in a first position. The base is moved from the first position to a second position to deploy the space structure. The release mechanisms are moved at substantially a same time to disengage from the features and release the space structure from the base without imparting a transverse load to the space structure when the base moves from the first position towards the second position to deploy the space structure.

20 Claims, 12 Drawing Sheets

(56) References Cited

U.S. PATENT DOCUMENTS

| | | | | |
|---|---|---|---|---|
| 7,861,976 B2* | 1/2011 | Holemans | ............... | B63B 21/08 244/119 |
| 7,946,208 B1* | 5/2011 | Howard et al. | .......... | B64D 1/04 244/137.4 |
| 8,162,256 B2* | 4/2012 | Goossen et al. | ...... | B64C 39/024 244/110 E |
| 8,939,409 B2* | 1/2015 | Apland et al. | ......... | B64G 1/641 244/173.1 |
| 8,939,672 B2* | 1/2015 | Johnson et al. | ......... | B64D 1/06 403/34 |
| 2016/0031572 A1* | 2/2016 | Dube | .................... | B64G 1/645 244/173.3 |

\* cited by examiner

SPACE STRUCTURE DEPLOYMENT SYSTEM

BACKGROUND INFORMATION

1. Field

The present disclosure relates generally to space structures and, in particular, to deploying space structures. Still more particularly, the present disclosure is related to a method and apparatus for deploying a space structure, such as a satellite.

2. Background

Launch vehicles may be used to carry payloads, people, or both from the earth into outer space. For example, a launch vehicle may carry a payload such as a satellite into outer space. Once the launch vehicle has reached a desired distance from the earth for deployment of the satellite, the satellite is separated from the launch vehicle through actuation of one or more deployment mechanisms.

Depending on the conditions and systems used during deployment, the satellite may tumble after separation from the launch vehicle. For example, some deployment systems for satellites use explosive bolts or multiple pusher springs to separate the satellite from the launch vehicle. These types of deployment systems release the satellite from multiple points. The potential for uneven force distribution applied to separate the satellite from the launch vehicle from these different points may be such that the satellite tumbles.

Some satellites may include a propulsion system to reduce or stop tumbling, as well as change the orientation of the satellite, or perform other maneuvers. Smaller satellites, however, may not include these types of systems to reduce size, weight, or both in the satellite. Smaller satellites that have limited or no attitude control range from Microsatellite class down to Femtosatellite class. The microsatellite class has a mass from 10 kg to 100 kg, and the Femtosatellite class has a mass from 0.001 kg to 0.01 kg.

For example, a cubesat is a type of miniaturized satellite. A cubesat has a volume of one liter and a mass that is no more than 1.33 kilograms. The dimensions of a 1 U cubesat is 10 cm×10 cm×10 cm. A 3 U cubesat is 30 cm×10 cm×10 cm.

A cubesat typically carries one or two scientific instruments. A cubesat, however, typically does not include a propulsion system. As a result, tumbling that may occur from deployment may exceed the torque authority of other attitude control actuators, like reaction wheels, and may therefore result in tumble rates that cannot be effectively reduced or eliminated by the cubesat subsystems. Therefore, it would be desirable to have a method and apparatus that take into account at least some of the issues discussed above, as well as other possible issues.

SUMMARY

An embodiment of the present disclosure provides an apparatus comprising a base and release mechanisms. The base is moveable. The release mechanisms are associated with the base. The release mechanisms engage features of a space structure to secure the space structure to the base when the base is in a first position and the release mechanisms move at substantially a same time to disengage from the features and release the space structure from the base during acceleration without imparting a transverse load to the space structure when the base moves towards a second position resulting in deployment of the space structure.

Another embodiment of the present disclosure provides a method for deploying a space structure. The space structure is secured to a base with release mechanisms that engage features of the space structure when the base is in a first position. The base is moved from the first position to a second position to deploy the space structure. The release mechanisms are moved at substantially a same time disengage from the features and to release the space structure from the base without imparting a transverse load to the space structure when the base moves from the first position towards the second position to deploy the space structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that currently used deployment systems with devices may apply different amounts of force to the satellite. For example, explosive bolts, springs, dampeners, and other devices may provide different amounts of force when used to release a satellite from a platform for deployment of the satellite.

These types of devices may result in different amounts of force, velocities, or both occurring at different parts of the satellite and potentially at slightly different times. This situation may result in undesired tumbling of the satellite.

The illustrative embodiments provide a solution to the technical problem involving undesired tumbling of a space structure, such as a satellite. Further, the illustrative embodiments provide a method and apparatus for deploying a space structure. In one illustrative embodiment, an apparatus comprises a base and release mechanisms. The base is moveable. The release mechanisms are associated with the base. The release mechanisms secure a space structure to the base when the base is in a first position. The release mechanisms move at substantially the same time to release the space structure from the base during acceleration without imparting transverse loads to the space structure when the base decelerates towards a second position resulting in deployment of the space structure. The apparatus has a technical effect of reducing or eliminating tumbling of the space structure.

Figure 1:
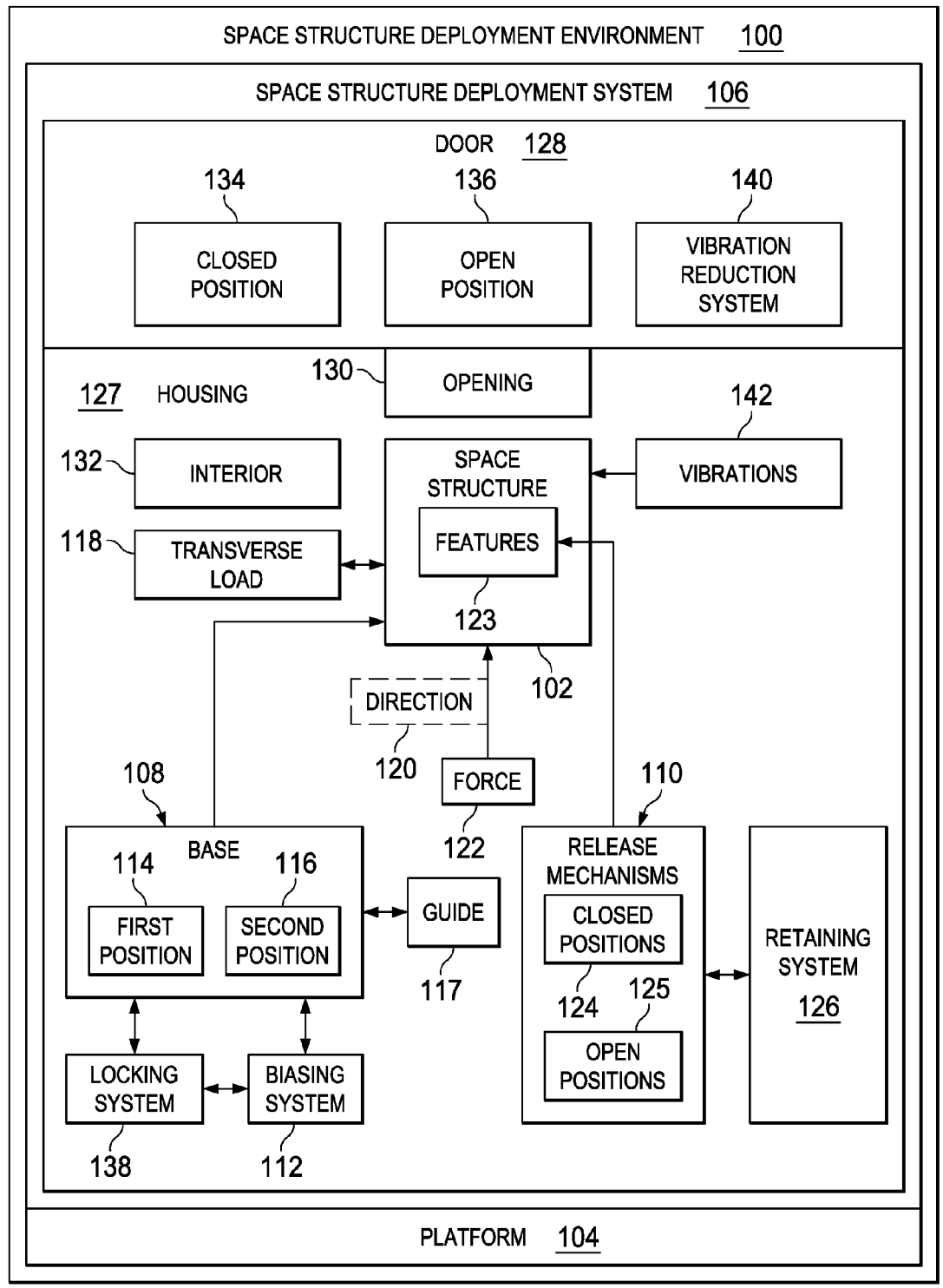
FIG. 1 is an illustration of a block diagram of a space structure deployment environment in accordance with an illustrative embodiment.

With reference now to the figures and, in particular, with reference to FIG. 1, an illustration of a block diagram of a space structure deployment environment is depicted in accordance with an illustrative embodiment. In space structure deployment environment 100, space structure 102 is deployed from platform 104 using space structure deployment system 106. This deployment occurs in outer space.

In this illustrative example, space structure 102 is a structure that is used in outer space. Outer space is a space or a void that exists between celestial bodies including the earth. For example, outer space may be a space that has a density of particles and pressure that is the closest approximation to a perfect vacuum. Outer space may be defined by the Kaman line, at an altitude of 100 km above sea level. The Kaman line is conventionally used as the start of outer space in space treaties and for aerospace records keeping.

Space structure 102 may take a number of different forms. For example, space structure 102 may be selected from one of a satellite, a cubesat, a space station, a spacecraft, or some other suitable structure.

In this illustrative example, platform 104 may take a number of different forms. For example, platform 104 may be selected from one of a space station, a rocket, a shuttle, an asteroid, or some other suitable type of platform.

In this illustrative example, space structure deployment system 106 is associated with platform 104. When one component is "associated" with another component, the association is a physical association in the depicted examples. For example, a first component, space structure deployment system 106, may be considered to be physically associated with a second component, platform 104, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

In this illustrative example, space structure deployment system 106 has a number of different components. As depicted, space structure deployment system 106 includes base 108, release mechanisms 110, and biasing system 112.

Base 108 is a structure that is moveable. In particular, base 108 may be moveable between first position 114 in which space structure 102 may be secured and second position 116 in which space structure 102 may be deployed by space structure deployment system 106.

In the illustrative example, guide 117 is a structure that guides movement of base 108 between first position 114 and second position 116. Guide 117 may be, for example, a rail, multiple rails, or some other suitable structure.

Guide 117 reduces transverse load 118 that may occur on space structure 102. In the illustrative example, transverse load 118 is a load relative to base 108. For example, transverse load 118 is a load that is orthogonal to direction 120 of force 122 generated by movement of base 108 from first position 114 toward second position 116.

As depicted, release mechanisms 110 are structures associated with base 108. Release mechanisms 110 secure space structure 102 to base 108 when base 108 is in first position 114. As depicted, release mechanisms 110 may secure features 123 on space structure 102. Features 123 are components of space structure 102 that release mechanisms 110 may engage to secure to base 108. For example, features 123 may include at least one of a post, a protrusion, a groove, an opening, a rod, a shaft, or some other suitable feature that may be found on space structure 102.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Features 123 are locations where force 122 may be applied to space structure 102 through release mechanisms 110 associated with base 108. With selected locations where force 122 is applied to space structure 102, transverse load 118 and other undesired loads applied to space structure 102 may be reduced. In the illustrative example, a constant amount of force 122 may be applied to each of features 123 at each of release mechanisms 110.

In this illustrative example, release mechanisms 110 move at substantially the same time to release space structure 102 from base 108 during acceleration of base 108 without imparting transverse load 118 to space structure 102 when base 108 decelerates towards second position 116, resulting in deployment of space structure 102. In another illustrative example, base 108 may not decelerate until reaching, or just before reaching, second position 116.

As depicted, biasing system 112 is one or more devices that move base 108 from first position 114 to second position 116. In the illustrative example, biasing system 112 may be selected from at least one of a spring, a hydraulic actuator, a linear actuator, a solenoid, or some other suitable biasing device.

As depicted, release mechanisms 110 are in closed positions 124 when base 108 is in first position 114 and move at substantially the same time to open positions 125 to release space structure 102 from base 108 without imparting transverse load 118 to space structure 102 when base 108 moves from first position 114 towards second position 116 to deploy space structure 102. In the illustrative example, release mechanisms 110 are biased to move at substantially the same time to release space structure 102 from base 108.

Additionally, space structure deployment system 106 also may include retaining system 126. As depicted, retaining system 126 prevents release mechanisms 110 from moving to release space structure 102 when base 108 is in first position 114.

In the illustrative example, space structure deployment system 106 may include other components such as housing 127 and door 128. As depicted, housing 127 has opening 130. In the illustrative example, base 108 and release mechanisms 110 are located in interior 132 within housing 127. Space structure 102 is also located inside interior 132 of housing 127 when space structure 102 is secured to base 108.

Door 128 moves between closed position 134 and open position 136. Door 128 covers opening 130 when in closed position 134.

In this illustrative example, space structure deployment system 106 also includes locking system 138. Locking system 138 prevents biasing system 112 from moving base 108 from first position 114. For example, locking system 138 holds base 108 in first position 114 when door 128 is in closed position 134. As depicted, locking system 138 allows biasing system 112 to move base 108 when door 128 is in open position 136.

Additionally, space structure deployment system 106 also may include vibration reduction system 140. Vibration reduction system 140 is a structure that is associated with door 128 in this illustrative example. Vibration reduction system 140 contacts space structure 102 such that vibrations 142 in space structure 102 are reduced when space structure 102 is secured to base 108 by release mechanisms 110 and door 128 is in closed position 134.

Vibration reduction system 140 may be, for example, a structure comprised of one or more materials selected from one of aluminum, elastomeric material, rubber, titanium, plastic, or some other suitable type of material. In another illustrative example, vibration reduction system 140 may be implemented using various types of devices. For example, vibration reduction system 140 may be implemented using one or more shock absorbers.

With space structure deployment system 106, undesired movement of space structure 102 may be reduced. For example, tumbling of space structure 102 when deployed by space structure deployment system 106 may be reduced as compared to currently used deployment systems. In one illustrative example, at least one of guide 117 or release mechanisms 110 reduce tumbling or other undesired movement of space structure 102 when deployed from space structure deployment system 106.

Figure 2:
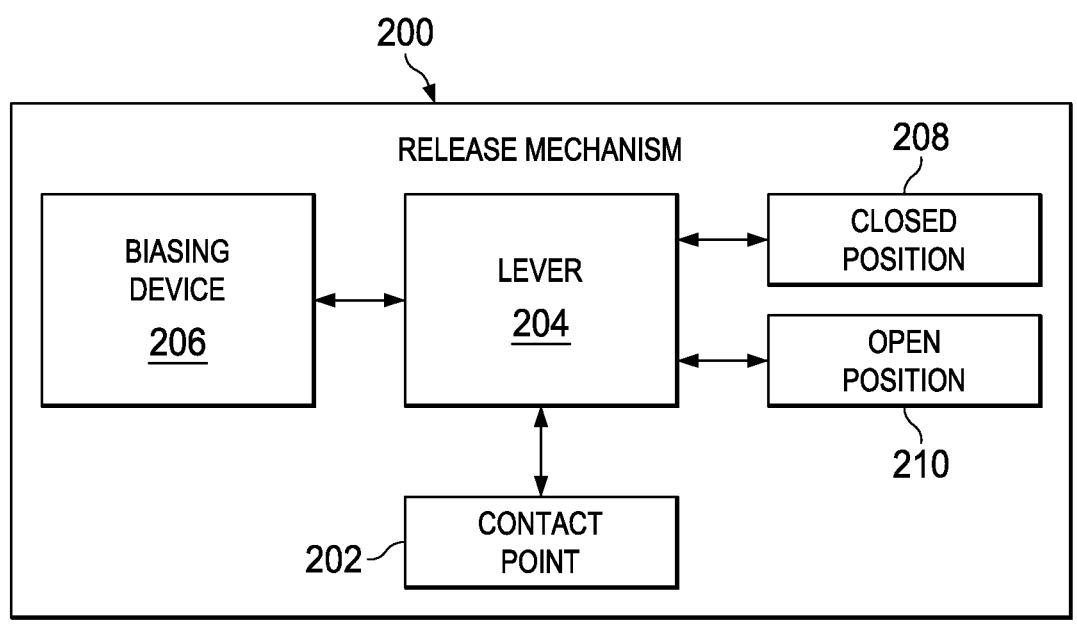
FIG. 2 is an illustration of a block diagram of a release mechanism in accordance with an illustrative embodiment.

Turning next to FIG. 2, an illustration of a block diagram of a release mechanism is depicted in accordance with an illustrative embodiment. In this illustrative example, release mechanism 200 is an example of an implementation for a release mechanism in release mechanisms 110 in FIG. 1.

In this illustrative example, release mechanism 200 includes a number of different components. As depicted, release mechanism 200 comprises contact point 202, lever 204, and biasing device 206.

Contact point 202 is a structure associated with the base. In this illustrative example, contact point 202 supports a feature in features 123 on space structure 102 in FIG. 1.

As depicted, lever 204 is moveable and secures the feature to contact point 202 when lever 204 is in closed position 208. In this illustrative example, lever 204 moves by rotating. When lever 204 rotates into open position 210, the feature may be moved away from contact point 202.

In the illustrative example, biasing device 206 moves lever 204 from closed position 208 to open position 210. This movement of lever 204 occurs when base 108 moves from first position 114 towards second position 116 such that features 123 shown in block form in FIG. 1 may disengage from contact point 202. In the illustrative example, biasing device 206 may be a linear spring, a torsion spring, a rotary motor, an elastomeric band, or some other suitable device or system.

The illustration of space structure deployment environment 100 and the different components in space structure deployment environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, space structure deployment environment 100 may include one or more additional deployment systems in addition to or in place of space structure deployment system 106. Each of the deployment systems may deploy space structures of the same or different type from platform 104.

Figure 3:
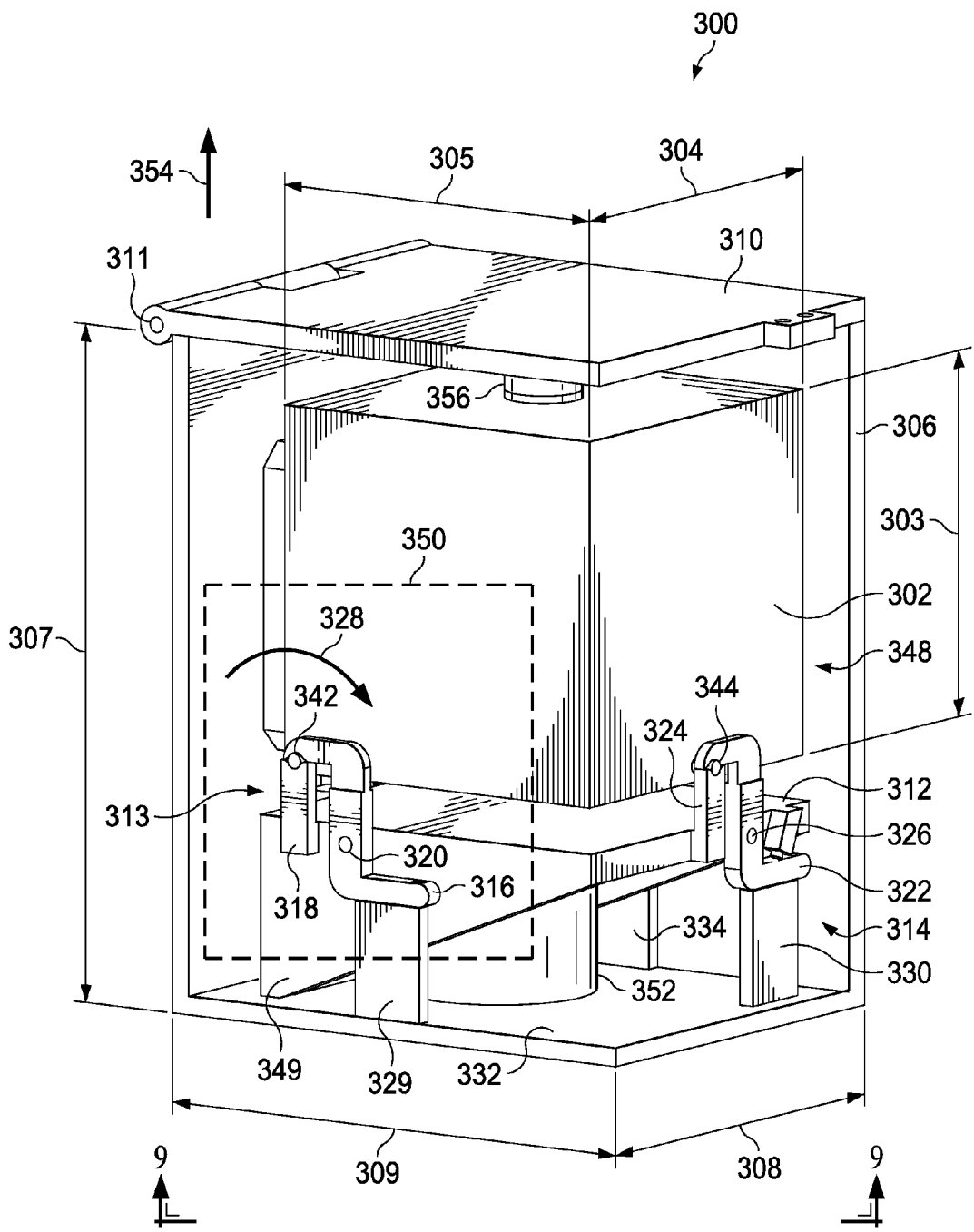
FIG. 3 is an illustration of a space structure deployment system in accordance with an illustrative embodiment.

Turning next to FIGS. 3-7, illustrations of a deployment sequence for a satellite are depicted in accordance with an illustrative embodiment. Turning first to FIG. 3, an illustration of a space structure deployment system is depicted in accordance with an illustrative embodiment.

In this illustrative example, space structure deployment system 300 is an example of one implementation for space structure deployment system 106 shown in block form in FIG. 1. In this example, space structure deployment system 300 is a satellite deployment system.

As depicted, space structure deployment system 300 holds satellite 302. Satellite 302 is an example of a physical implementation of space structure 102 shown in block form in FIG. 1. As depicted, satellite 302 may be 1 U cubesat with length 303, width 304, and height 305. In this illustrative example, length 303 may be about 10 cm; width 304 may be about 10 cm; and height 305 may be about 10 cm.

In this particular example, satellite 302 is shown as being located within housing 306 of space structure deployment system 300. Housing 306 is shown in an exposed view to more clearly illustrate the different features in space structure deployment system 300. As depicted, housing 306 has length 307, width 308, and height 309. In this illustrative example, length 307 may be about 18 cm; width 308 may be about 12 cm; and height 309 may be about 12 cm.

Door 310 is connected to housing 306 at hinge 311. Door 310 is shown in a closed position in this figure.

As depicted, space structure deployment system 300 includes base 312. As depicted, release mechanisms are associated with base 312 and secure satellite 302 to base 312. In this illustrative example, three release mechanisms are present. In this view, release mechanism 313 and release mechanism 314 are shown. The third release mechanism is not seen in this view.

As depicted, release mechanism 313 comprises lever 316, contact point 318, and spring 320. Release mechanism 314 comprises lever 322, contact point 324, and spring 326.

In this illustrative example, spring 320 biases lever 316 to rotate in the direction of arrow 328. Additionally, spring 326 biases lever 322 to rotate in the direction of arrow 328.

In this view, the rotation of lever 316 and lever 322 is prevented by a retaining system. As depicted, retaining system includes elongate structure 329 and elongate structure 330.

In the illustrative example shown in this figure, elongate structure 329 and elongate structure 330 may be posts extending from surface 332 of housing 306. Elongate structure 329 contacts lever 316 and prevents lever 316 from moving in the direction of arrow 328. In a similar fashion, elongate structure 330 contacts lever 322 and prevents lever 322 from moving in the direction of arrow 328.

In this illustrative example, elongate structure 334 is also shown and contacts another lever not seen in this view. Elongate structure 334 also prevents that lever from moving in the direction of arrow 328.

As depicted, satellite 302 has feature 342 and feature 344. Feature 342 and feature 344 are structures on satellite 302 that may be secured to base 312. In this example, another feature is present or not shown on side 348 of satellite 302.

Contact point 318 supports feature 342 and contact point 324 supports feature 344 in this illustrative example. As depicted, contact point 318 is a structure extending from surface 349 of base 312. Contact point 324 also is a structure extending from surface 349 of base 312. Contact point 318 has a shape that engages feature 342, and contact point 324 has a shape that engages feature 344. A more detailed view of release mechanism 313 and contact point 318 in section 350 are shown and described in FIG. 8 below.

Also present in space structure deployment system 300 is biasing system 352. Biasing system 352 includes a spring. Biasing system 352 biases base 312 in the direction of arrow 354. As depicted, biasing system 352 may be a spring, a linear actuator, a solenoid, or any other type of device chosen as one that can impart a force on base 312. In other words, biasing system 352 applies a force to move base 312 in the direction of arrow 354.

In this illustrative example, space structure deployment system 300 also includes vibration reduction structure 356. In this example, vibration reduction structure 356 is an example of an implementation of a physical structure that may be used to implement vibration reduction system 140 shown in block form in FIG. 1. As depicted, vibration reduction structure 356 is associated with door 310. Vibration reduction structure 356 contacts satellite 302 such that vibrations in satellite 302 are reduced when satellite 302 is secured to base 312 by the release mechanisms and door 310 is in the closed position as seen in this figure.

Figure 4:
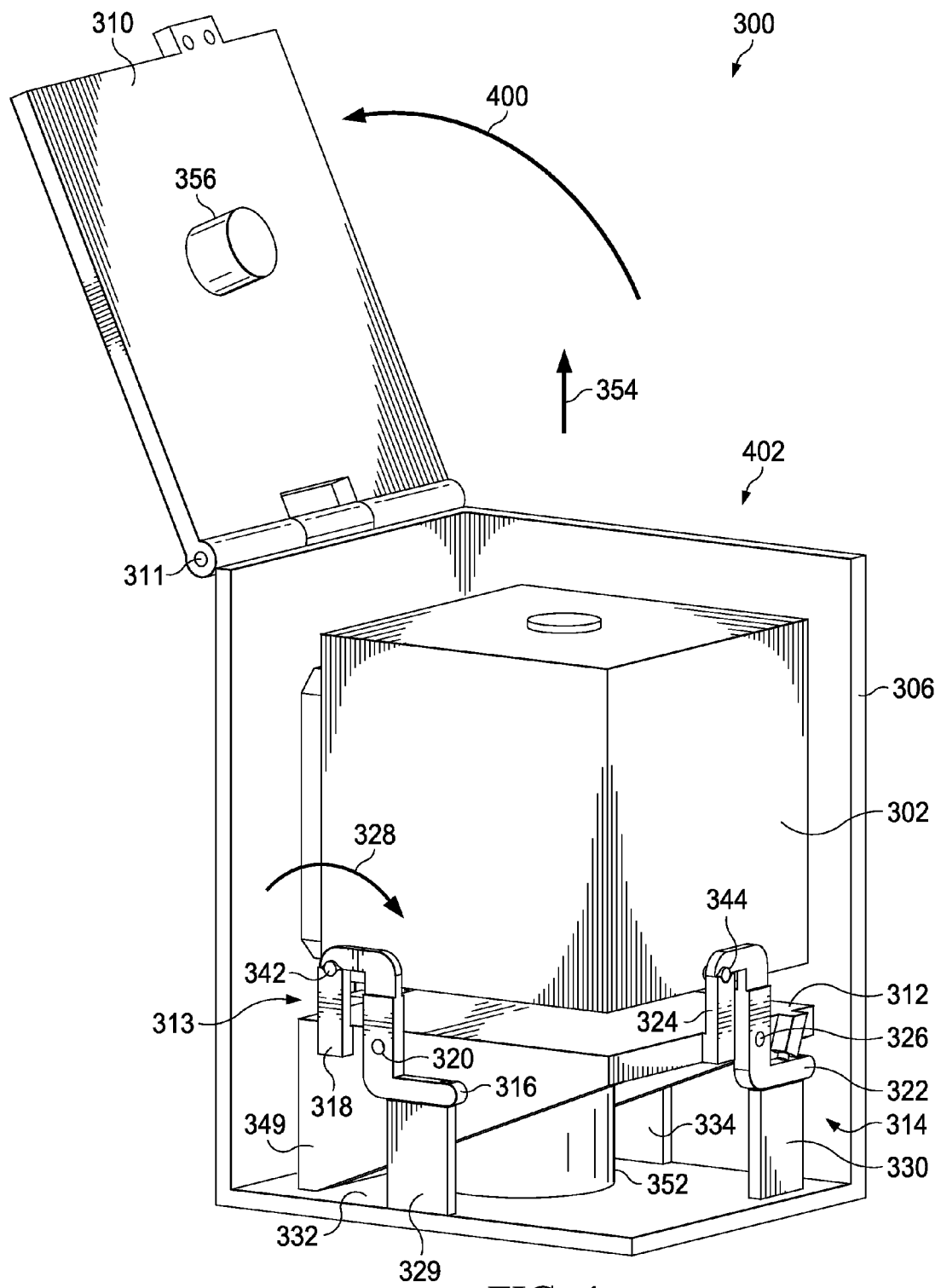
FIG. 4 is an illustration of a space structure deployment system in accordance with an illustrative embodiment.

Turning next to FIG. 4, an illustration of a space structure deployment system is depicted in accordance with an illustrative embodiment. In this figure, door 310 has moved in the direction of arrow 400 and from a closed position into the open position shown in this figure. Door 310 exposes opening 402 in housing 306. When exposed, opening 402 allows satellite 302 to be deployed from housing 306.

In this view, a locking mechanism (not shown) allows biasing system 352 to move base 312 in the direction of arrow 354 when door 310 has been opened. When door 310 is closed, the locking mechanism prevents biasing system 352 from moving base 312. In the illustrative example, the locking mechanism secures base 312. In other illustrative examples, the locking mechanism may prevent biasing system 352 from applying a force to move base 312. In this illustrative example, the locking mechanism may be, for example, a burn wire, an actuator, or some other suitable mechanism that is activated to allow biasing system 352 to move base 312 from the first position to a second position when door 310 is in the open position.

Figure 5:
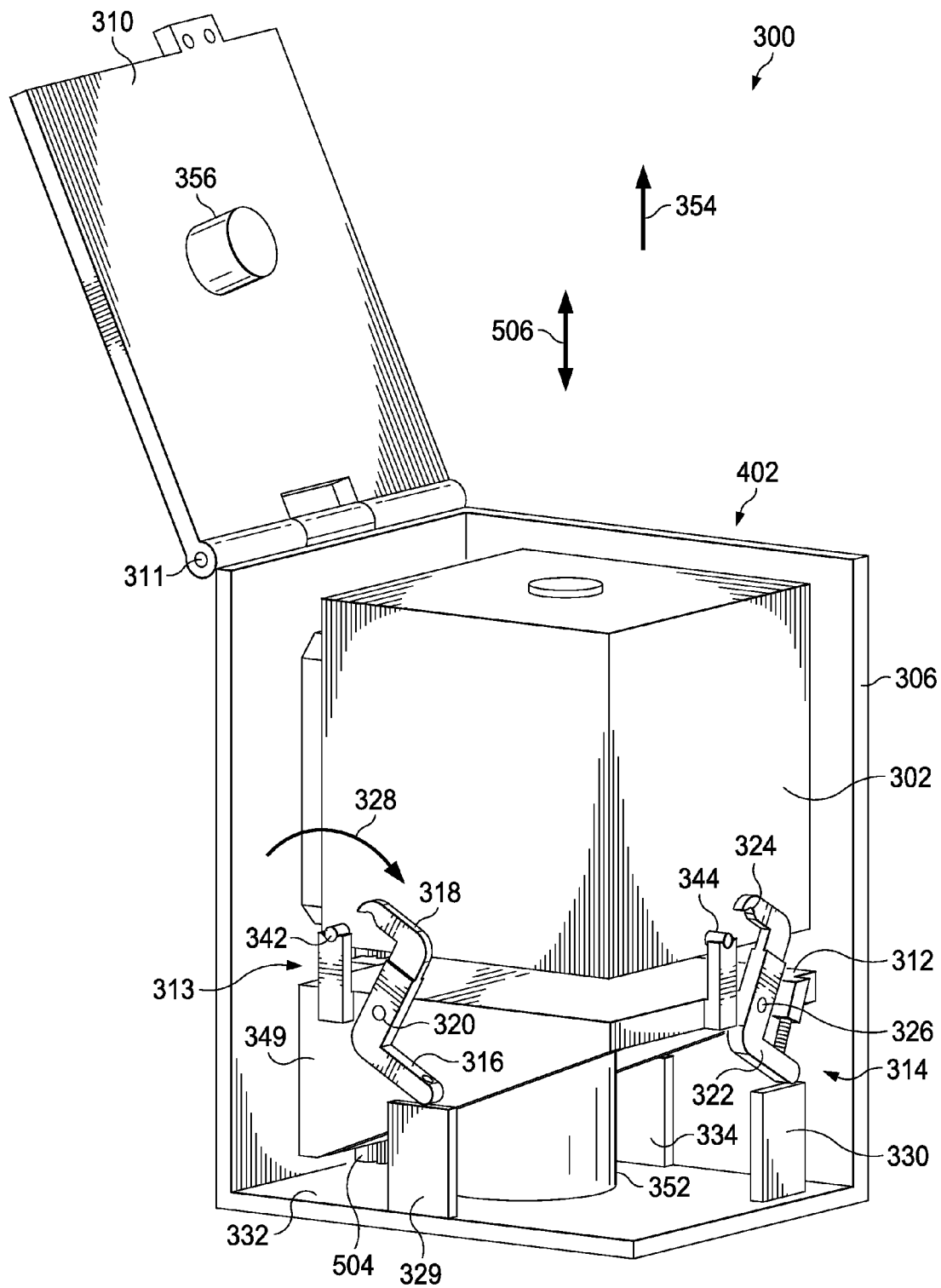
FIG. 5 is an illustration of a space structure deployment system moving a satellite for deployment in accordance with an illustrative embodiment.

Turning next to FIG. 5, an illustration of a space structure deployment system moving a satellite for deployment is depicted in accordance with an illustrative embodiment. In this view, base 312 has moved from the first position towards the second position. This movement applies a force to satellite 302 at feature 342, feature 344, and another feature on side 348 not seen in this view connected to contact point 318, contact point 324, and another contact point not seen in this view.

In this illustrative example, base 312 moves in the direction of arrow 354 along guide rail 504. Guide rail 504 constrains movement of base 312 along axis 506. Guide rail 504 aids in reducing transverse motion in a direction orthogonal to arrow 354.

As base 312 moves in the direction of arrow 354, base 312 decelerates. In this illustrative example, a deceleration occurs prior to reaching the second position. In this depicted example, a spring is used as a biasing system and the maximum acceleration occurs when base 312 starts moving from the first position. This first position is where the spring force is at a maximum. When a linear actuator or solenoid is used for the biasing system, the maximum acceleration can be set to a desired location between the first position and the second position.

Also shown in FIG. 5 is a change in the position of lever 316 and lever 322. Movement of base 312 in the direction of arrow 354 moves lever 316 away from elongate structure 329 and lever 322 away from elongate structure 330. As a result, lever 316 and lever 322 move in the direction of arrow 328 to the position shown in this figure. In this illustrative example, this movement of lever 316 and lever 322 is a rotational movement. The other lever, not seen in this view, also rotates in a similar fashion.

Figure 6:
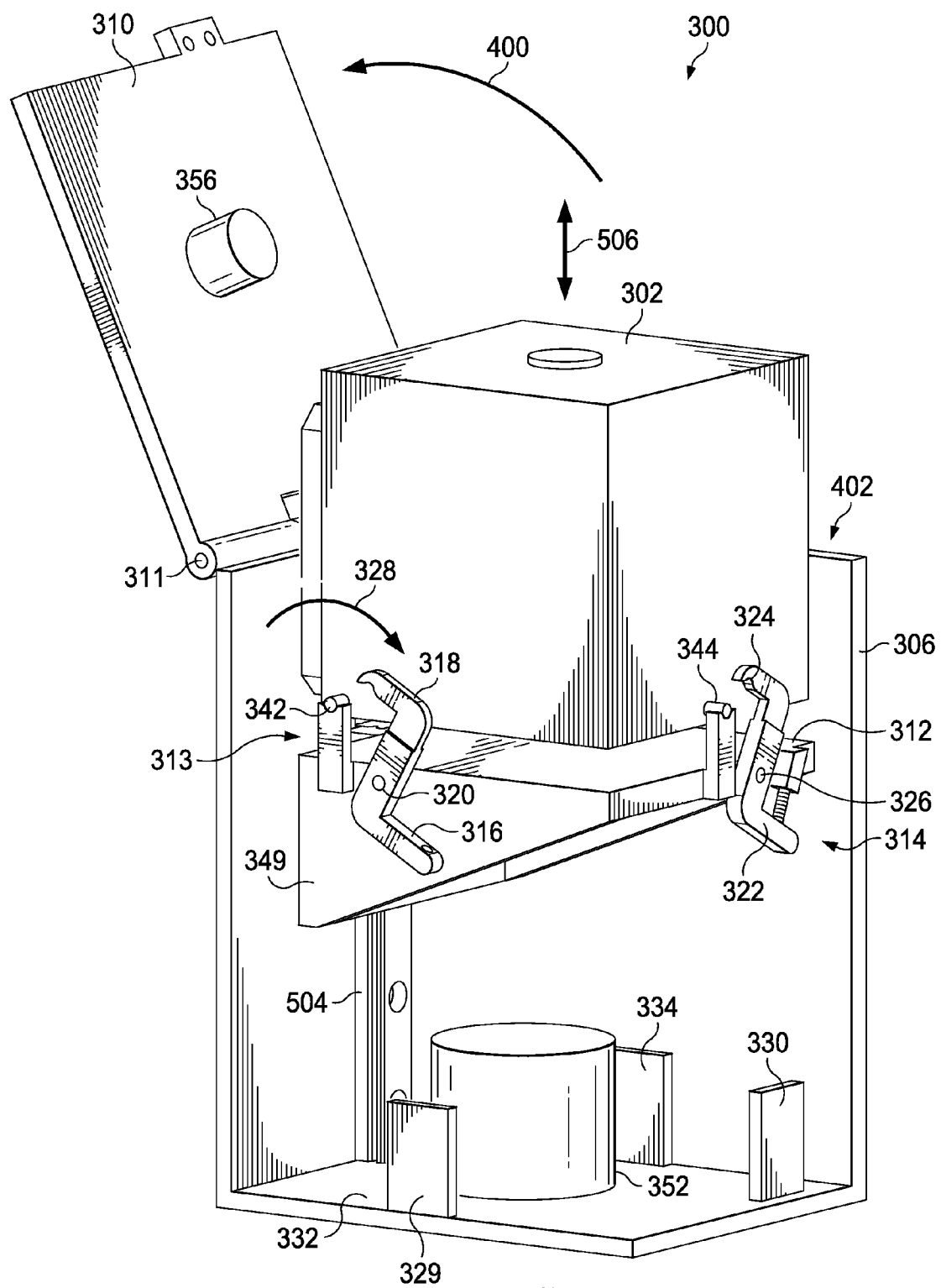
FIG. 6 is an illustration of a space structure deployment system moving a satellite for deployment in accordance with an illustrative embodiment.

Referring now to FIG. 6, an illustration of a space structure deployment system moving a satellite for deployment is depicted in accordance with an illustrative embodiment. In this figure, base 312 has reached the second position. In this view, lever 316 and lever 322 have moved in a manner that allows feature 342 to move away from contact point 318, and feature 344 to move away from contact point 324 without touching lever 316 or lever 322.

Figure 7:
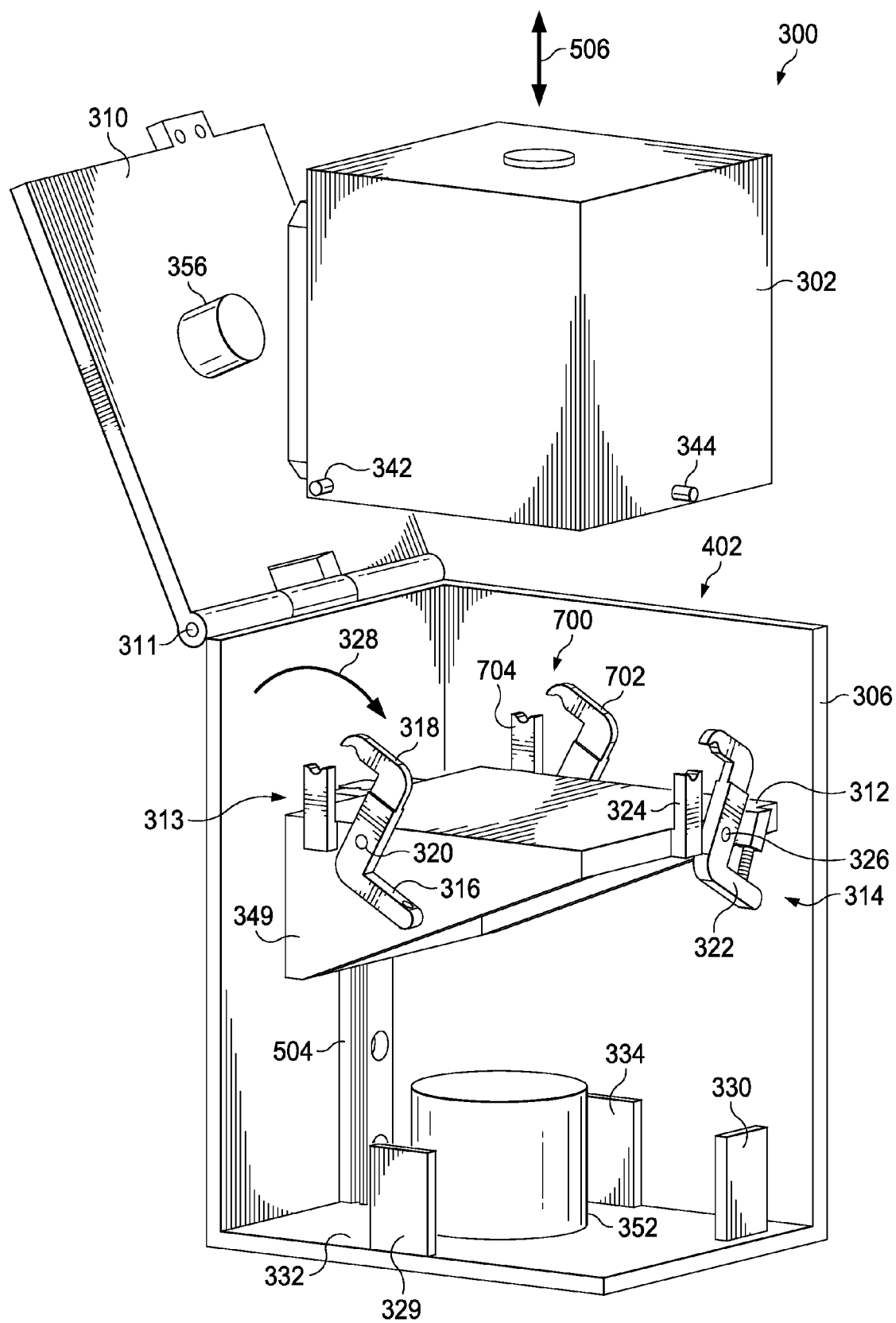
FIG. 7 is an illustration of a space structure deployment system moving a satellite for deployment in accordance with an illustrative embodiment.

With reference next to now to FIG. 7, an illustration of a space structure deployment system moving a satellite for deployment is depicted in accordance with an illustrative embodiment. In this figure, satellite 302 moves away from base 312 and other components in space structure deployment system 300.

In this view, release mechanism 700 is shown. Release mechanism 700 includes lever 702 and contact point 704. The spring that biases lever 702 is not seen in this view.

With space structure deployment system 300, tumbling or other undesired movement of satellite 302 is reduced or eliminated. As a result, when satellite 302 does not include a propulsion system or other mechanism to reduce tumbling, satellite 302 may be deployed in a manner in which tumbling is reduced or eliminated.

Figure 8:
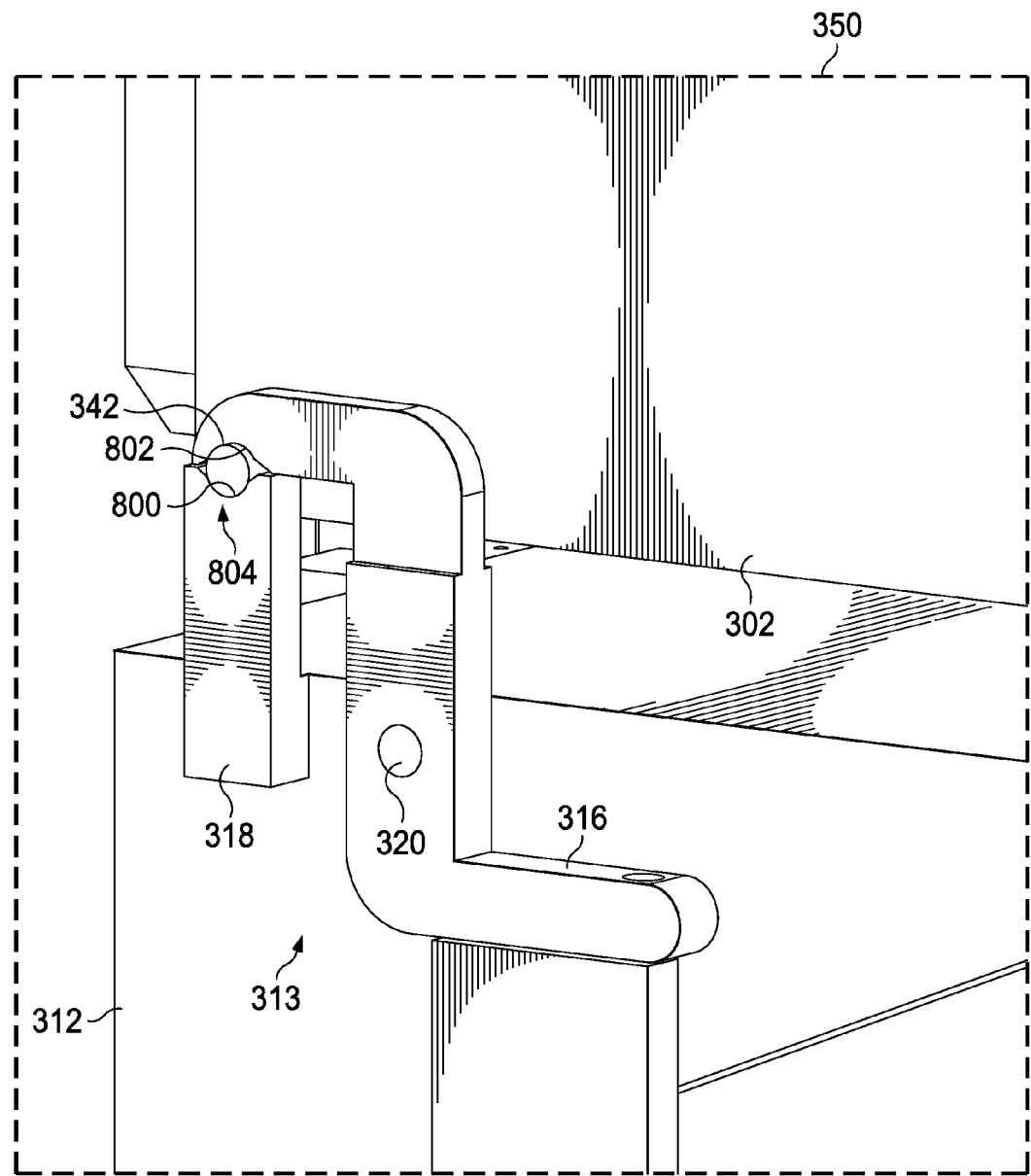
FIG. 8 is an illustration of a release mechanism in accordance with an illustrative embodiment.

Turning now to FIG. 8, an illustration of a release mechanism is depicted in accordance with an illustrative embodiment. FIG. 8 is a more detailed view of release mechanism 313 in section 350 in FIG. 3.

In this view, lever 316 is in a closed position such that release mechanism 313 secures feature 342 to secure satellite 302 to base 312. Contact point 318 has groove 800, and lever 316 has groove 802.

When lever 316 is in a closed position, feature 342 is held in slot 804 formed by groove 800 on contact point 318 and groove 802 on lever 316. In this configuration, feature 342 is secured by release mechanism 313.

When lever 316 rotates to an open position, feature 342 is supported in groove 800 of contact point 318. In this configuration, force may be applied to feature 342 when base 312 moves. Additionally, feature 342 may move away from contact point 318 when movement of base 312 decreases or stops.

Figure 9:
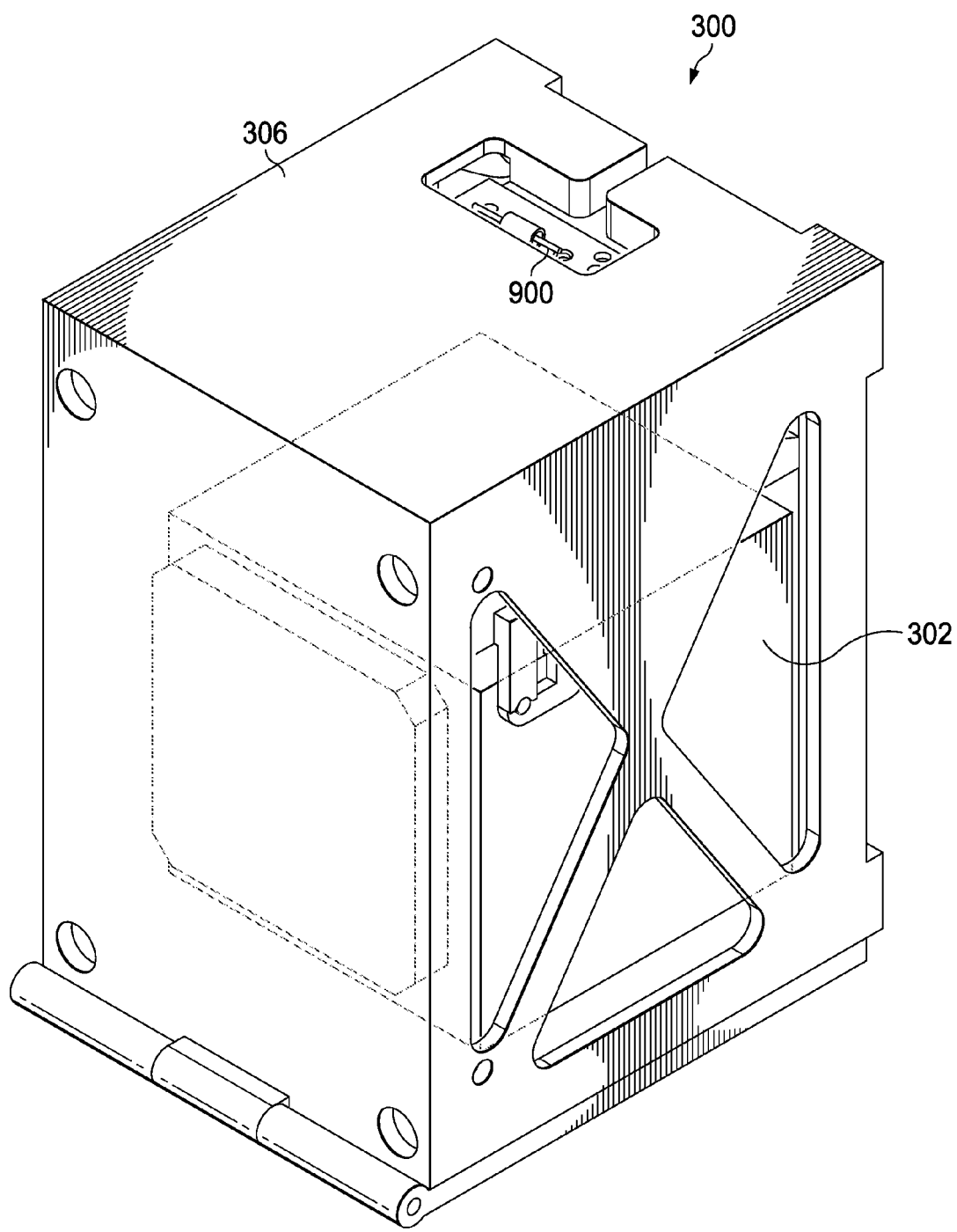
FIG. 9 is an illustration of a space structure deployment system in accordance with an illustrative embodiment.

Turning now to FIG. 9, an illustration of a space structure deployment system is depicted in accordance with an illustrative embodiment. In this figure, space structure deployment system 300 is shown in the direction of lines 9-9 in FIG. 3.

In this view, burn wire 900 is a locking mechanism used to hold base 312 in the first position. When satellite 302 is to be deployed, burn wire 900 is activated and releases base 312 such that biasing system 352 (not shown) moves satellite 302 in the direction of arrow 354.

Figure 10:
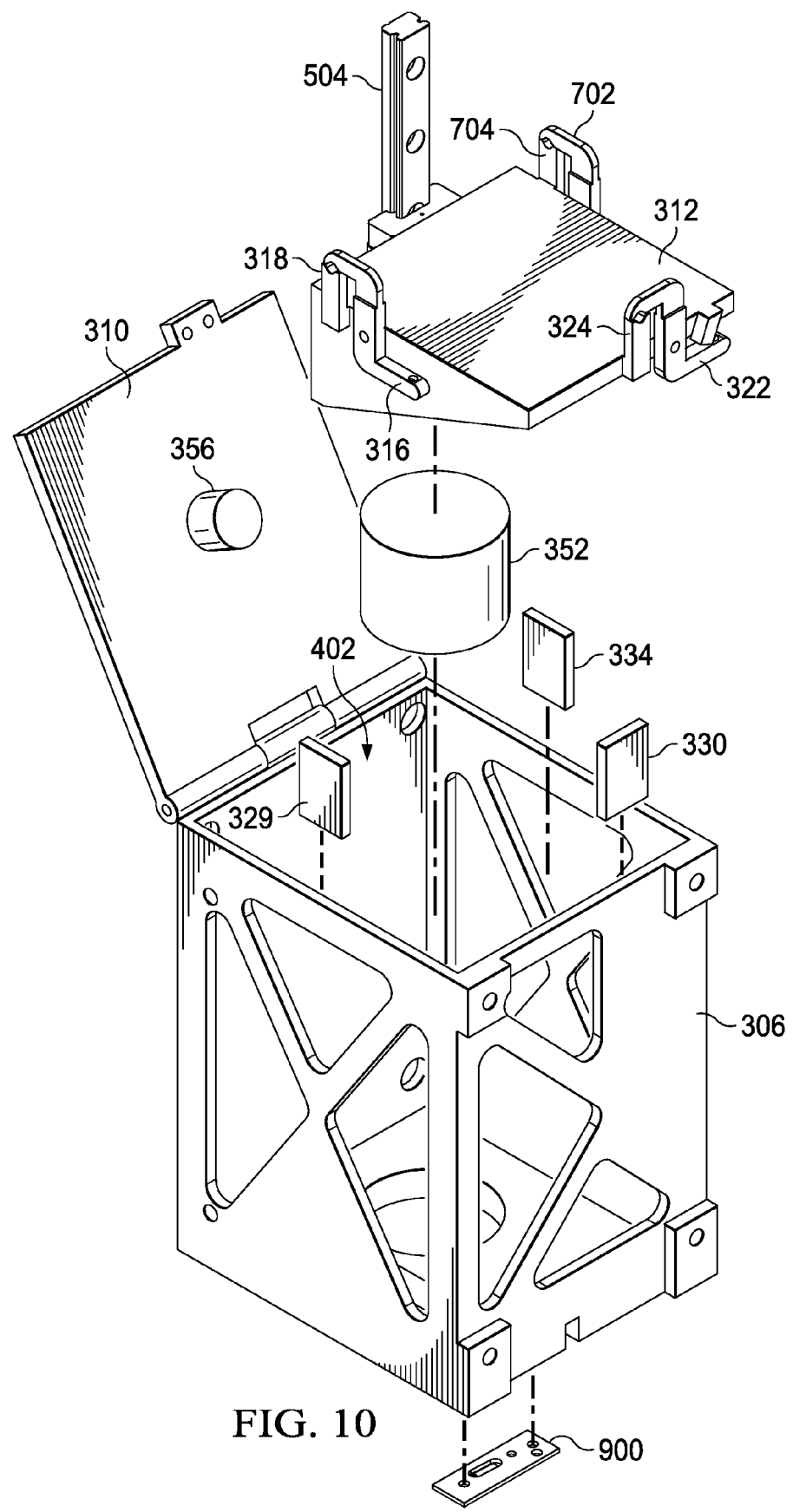
FIG. 10 is an illustration of a space structure deployment system in accordance with an illustrative embodiment.

With reference next to FIG. 10, an illustration of a space structure deployment system is depicted in accordance with an illustrative embodiment. In this figure, an exploded view of space structure deployment system 300 is shown without satellite 302.

The space structure deployment systems shown in FIGS. 3-10 are designed to be modular. In other words, multiple space structure deployment structure systems may be arranged to form a system that deploys multiple satellites.

Figure 11:
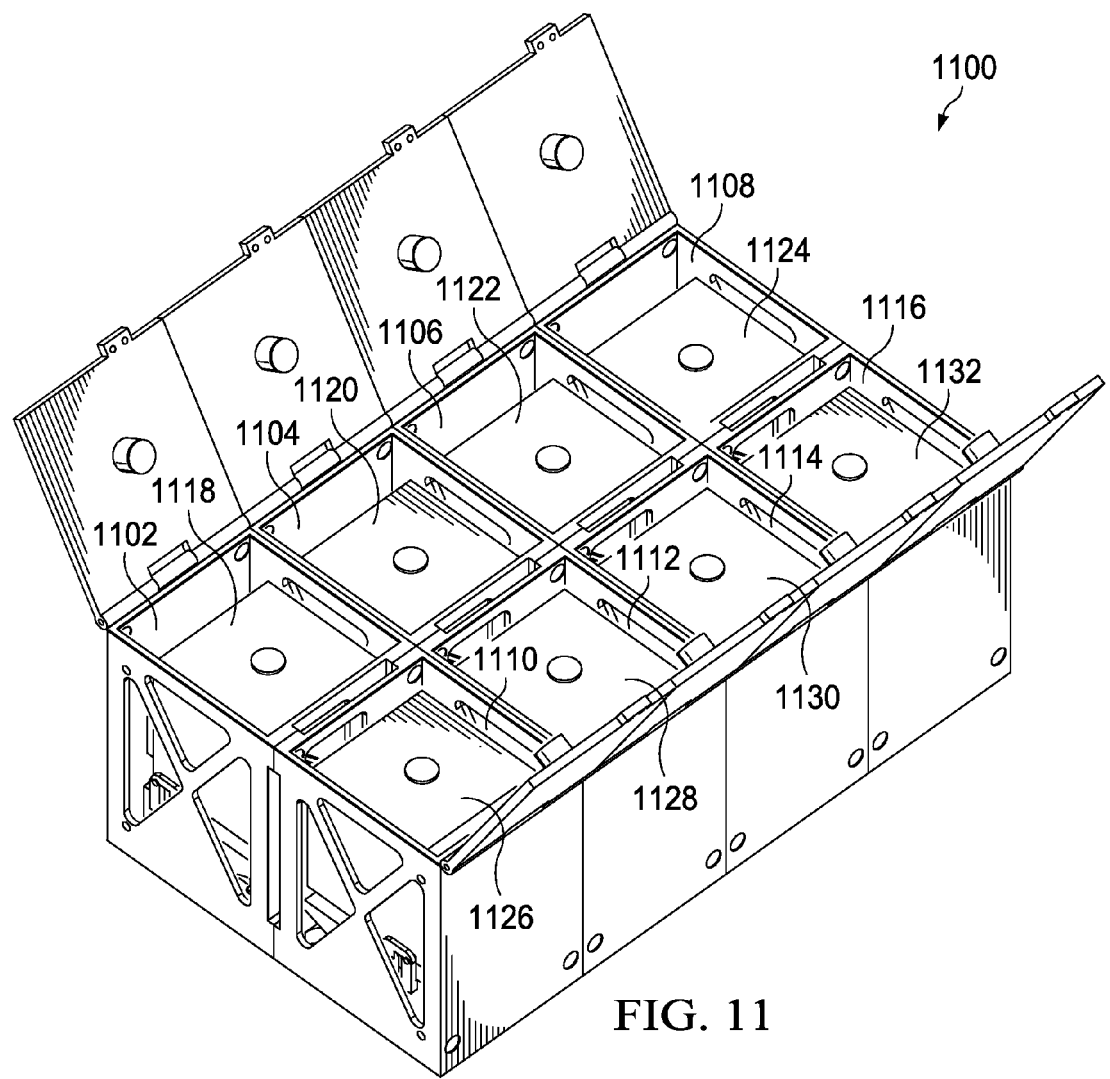
FIG. 11 is an illustration of a platform with multiple space structure deployment systems in accordance with an illustrative embodiment.

Turning now to FIG. 11, an illustration of a platform with multiple space structure deployment systems is depicted in accordance with an illustrative embodiment. In this illustrative example, platform 1100 includes space structure deployment system 1102, space structure deployment system 1104, space structure deployment system 1106, space structure deployment system 1108, space structure deployment system 1110, space structure deployment system 1112, space structure deployment system 1114, and space structure deployment system 1116.

These space structure deployment systems are used to deploy satellite 1118, satellite 1120, satellite 1122, satellite 1124, satellite 1126, satellite 1128, satellite 1130, and satellite 1132, respectively. These different satellites may be deployed at the same or different times from the different space structure deployment systems.

The illustration of space structure deployment system 300 in FIGS. 3-11 is provided as one example of a physical implementation of space structure deployment system 106 in FIG. 1 and not meant to limit the manner in which other embodiments may be implemented. For example, door 310 is shown as being attached by hinge 311 to open and close. In other illustrative examples, the door 310 may be an iris that opens and closes. In yet another illustrative example, door 310 may be separated from housing 306.

As yet another example, although three release mechanisms are shown, other numbers of release mechanisms also may be used depending on the particular implementation. For example, four release mechanisms, two release mechanisms, or some other numbers of release mechanisms may be used to apply force to features on a satellite.

In yet another illustrative example, a space structure deployment system may be deployed using a spacecraft as the housing. For example, the different components of the space structure deployment system may be placed in a bay of a space shuttle without housing 306 and door 310.

As another example, other sizes of satellites may be deployed other than the 1 U cubesat described for the illustrative example above. Additionally, the satellites deployed may have other shapes that may be irregular.

The different components shown in FIGS. 3-11 may be combined with components in FIGS. 1 and 2, used with components in FIGS. 1 and 2, or a combination of the two. Additionally, some of the components in FIGS. 3-11 may be illustrative examples of how components shown in block form in FIGS. 1 and 2 can be implemented as physical structures.

Figure 12:
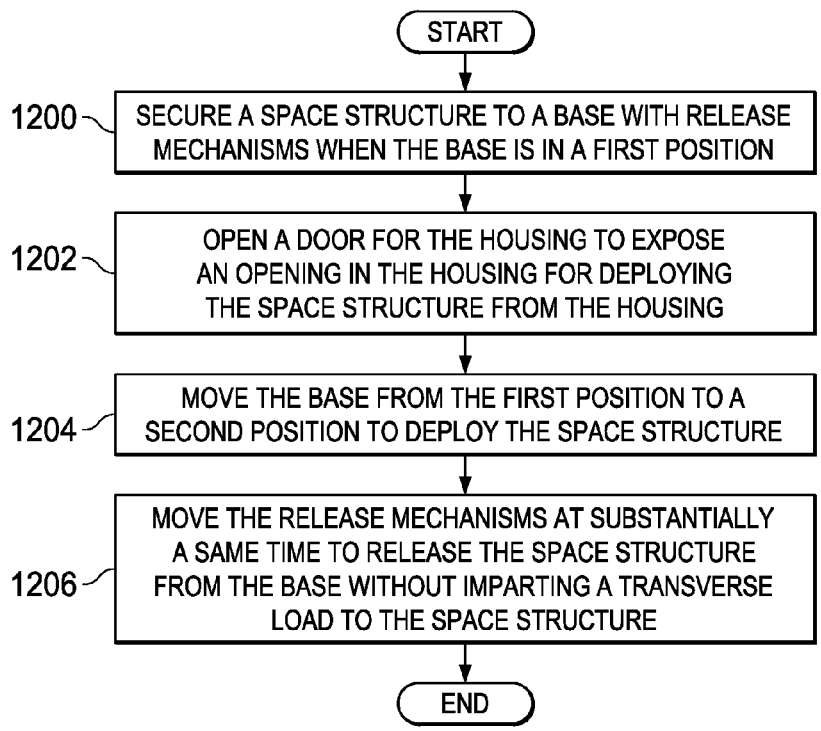
FIG. 12 is an illustration of a flowchart of a process for deploying a space structure in accordance with an illustrative embodiment.

With reference now to FIG. 12, an illustration of a flowchart of a process for deploying a space structure is depicted in accordance with an illustrative embodiment. The process illustrated in FIG. 12 may be implemented in space structure deployment environment 100 in FIG. 1. In particular, the different operations may be implemented using space structure deployment system 106 in FIG. 1.

The process begins by securing a space structure to a base with release mechanisms when the base is in a first position (operation 1200). The base and the space structure are located in a housing in operation 1200.

The process opens a door for the housing to expose an opening in the housing for deploying the space structure from the housing (operation 1202). The opening allows the space structure to move out of the housing through the opening when the base moves from the first position to the second position.

Next, the process moves the base from the first position to a second position to deploy the space structure (operation 1204). The process then moves the release mechanisms at substantially a same time to release the space structure from the base without imparting a transverse load to the space structure (operation 1206), with the process terminating thereafter. Operation 1206 occurs when the base moves from the first position towards the second position to deploy the space structure.

Figure 13:
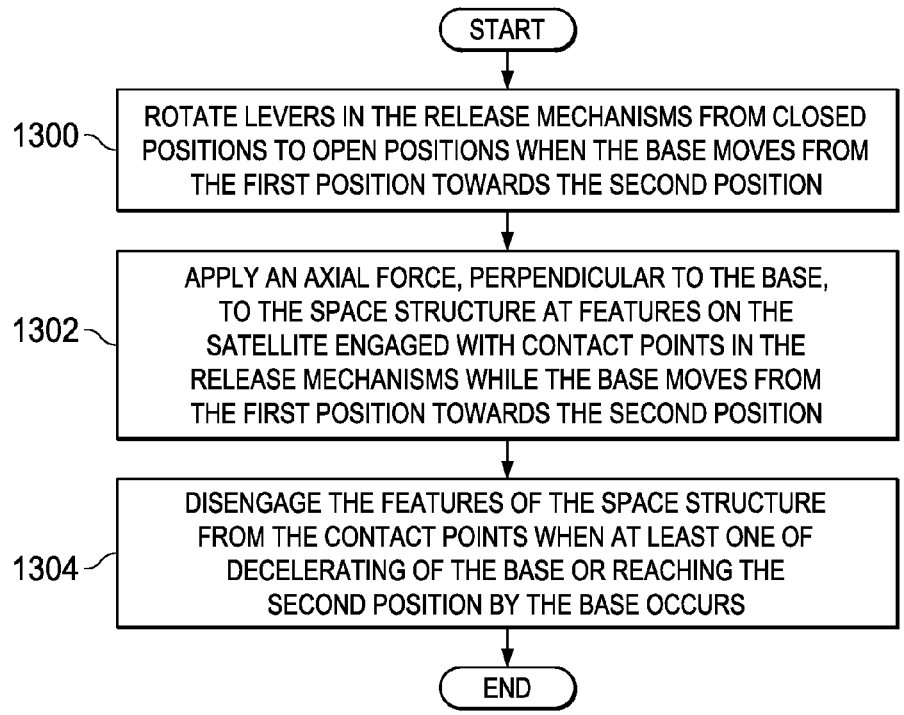
FIG. 13 is an illustration of a flowchart of a process for moving release mechanisms in accordance with an illustrative embodiment.

Turning next to FIG. 13, an illustration of a flowchart of a process for moving release mechanisms is depicted in accordance with an illustrative embodiment. The process illustrated in FIG. 13 is an example of operations that may be performed in operation 1206 in FIG. 12. In this example, the space structure has features that are engaged with the release mechanisms when the base is in the first position.

The process begins by rotating levers in the release mechanisms from closed positions to open positions when the base moves from the first position towards the second position (operation 1300). In operation 1300, the levers no longer secure the features to the contact points when the levers are in the open position. Additionally, in the open position, the levers do not contact the features or other portions of the space structure when the space structure moves away from the base after the base reaches the second position.

The process applies an axial force, perpendicular to the base, to the space structure at features on the satellite engaged with contact points in the release mechanisms while the base moves from the first position towards the second position (operation 1302). In operation 1302 the space structure accelerates in the direction of the force when deploying the space structure.

The process disengages the features of the space structure from the contact points when at least one of decelerating of the base or reaching the second position by the base occurs (operation 1304), with the process terminating thereafter. In operation 1304, the features move away from the contact points. Additionally, in the open position, the levers do not contact the features or other portions of the space structure when the space structure moves away from the decelerating base and after the base reaches the second position.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1204 and operation 1206 may be performed at about the same time and not in the sequential order showed. For example, operation 1204 may begin and operation 1206 may begin after operation 1204 has started. In yet another illustrative example, an operation may be included to unlock or allow the base to move after the door is in the open position.

Thus, one or more illustrative embodiments provide a method and apparatus for deploying a space structure that reduces or overcomes a technical problem involving undesired rotation, such as tumbling, of a space structure after deployment. One illustrative embodiment employs a space structure deployment system that has a technical effect of reducing tumbling or other undesired movement of a space structure that is deployed by the space structure deployment system. In the illustrative examples, at least one of a guide rail or release mechanisms reduce transverse loads or other undesired loads during movement of the base from a first position to a second position to deploy the space structure. In this manner, at least one of tumbling of the space structure or shock applied to the space structure is reduced when the space structure is deployed.

With the use of a space structure deployment system in accordance with an illustrative embodiment, smaller satellites, such as a cubesat, may be deployed in a manner that avoids tumbling or other undesired movement of the satellite. As a result, a satellite does not need a propulsion system or other system to correct for tumbling using a space structure deployment system in accordance with an illustrative embodiment to deploy the satellite.

The different illustrative examples describe components that perform actions or operations. In an illustrative embodiment, a component is configured to perform the action or operation described. For example, the component may have a configuration or design that provides the component an ability to perform the action or operation that is described in the illustrative examples as being performable by the component.

The description of the different illustrative embodiments has been presented for purposes of illustration and descrip-tion, and is not intended to be exhaustive or limited to the embodiments in the form disclosed. Many modifications and variations will be apparent to those of ordinary skill in the art. For example, the space structure deployment system has been described with respect to a particular size of satellite having a cube shape. Other illustrative embodiments may be applied to other sizes and shapes of satellite or other types of space structures. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a base that is moveable; and
release mechanisms associated with the base, wherein the release mechanisms engage features of a space structure to secure the space structure to the base when the base is in a first position and the release mechanisms move at substantially a same time to disengage from the features and release the space structure from the base during acceleration without imparting a transverse load to the space structure, the release mechanisms including:
a lever that has a closed position to secure one of the features and the space structure, and rotates to an open position in a manner that allows the feature and space structure to move, wherein an elongate structure extending from a surface of a housing holds the lever in the closed position and wherein when the lever rotates from the closed position to an open position the lever does not contact the feature or other portions of the space structure when the space structure moves within the housing, to thereby reduce transverse loads during movement of the base to deploy the space structure.

2. The apparatus of claim 1 further comprising:
a biasing system that moves the base from the first position to the second position.

3. The apparatus of claim 1 further comprising:
the housing having an opening, wherein the base and the release mechanisms are located within the housing and wherein the space structure is located inside the housing when the space structure is secured to the base; and
a door that moves between a closed position and an open position and covers the opening when in the closed position.

4. The apparatus of claim 3 further comprising:
a vibration reduction structure associated with the door, wherein the vibration reduction structure contacts the space structure such that vibrations in the space structure are reduced when the space structure is secured to the base by the release mechanisms and the door is in the closed position.

5. The apparatus of claim 4 further comprising:
a locking system that holds the base in the first position when the door is in the closed position.

6. The apparatus of claim 1, wherein the release mechanisms are in closed positions when the base is in the first position and move at substantially the same time to open positions to release the space structure from the base without imparting the transverse load to the space structure when the base moves from the first position towards the second position to deploy the space structure.

7. The apparatus of claim 1 further comprising:
a retaining system that prevents the release mechanisms from moving to release the space structure when the base is in the first position.

8. The apparatus of claim 1, wherein a release mechanism in the release mechanisms comprises:
a contact point associated with the base, wherein the contact point supports a feature on the space structure;
the lever secures the feature to the contact point when the lever is in a closed position; and
a biasing device that moves the lever from the closed position to an open position when the base moves from the first position towards the second position such that the feature disengages from the contact point.

9. The apparatus of claim 8, wherein the contact point comprises:
the structure extending from a surface of the base and having a shape that engages the feature on the space structure.

10. The apparatus of claim 1, wherein the release mechanisms comprise:
three release mechanisms.

11. The apparatus of claim 1, wherein at least one of tumbling of the space structure or shock applied to the space structure is reduced when the space structure is deployed.

12. The apparatus of claim 1, wherein the space structure is selected from one of a satellite, a space station, and a spacecraft.

13. A method for deploying a space structure, the method comprising:
securing the space structure to a base with release mechanisms that engage features of the space structure when the base is in a first position;
moving the base from the first position to a second position to deploy the space structure; and
moving the release mechanisms at substantially a same time to disengage from the features and release the space structure from the base without imparting a transverse load to the space structure when the base moves from the first position towards the second position to deploy the space structure, wherein the release mechanisms include a lever that has a closed position to secure one of the features and the space structure, which rotates to an open position in a manner that allows the feature and space structure to move, and
wherein an elongate structure extending from a surface of a housing holds the lever in the closed position and moving the release mechanisms comprises rotating the lever from the closed position to an open position in which the lever does not contact the feature or other portions of the space structure when the space structure moves within the housing, to thereby reduce transverse loads during movement of the base to deploy the space structure.

14. The method of claim 13, wherein the base and the space structure are located in the housing when the base is in the first position and further comprising:
opening a door for the housing to expose an opening in the housing for deploying the space structure from the housing, wherein the space structure moves out of the housing through the opening when the base moves from the first position to the second position.

15. The method of claim 14 further comprising:
contacting the space structure with a vibration reduction structure associated with the door in the housing in which the space structure is located, wherein the vibration reduction structure reduces vibrations in the space structure when the door is closed.

16. The method of claim 14, wherein moving the base comprises:
moving the base from the first position to the second position with a biasing system after the door opens.

17. The method of claim 13, wherein the level is a lever in a plurality of levers, wherein the space structure has features that are engaged with the release mechanisms when the base is in the first position, and wherein moving the release mechanisms comprises:
rotating the levers in the release mechanisms from closed positions to open positions when the base moves from the first position towards the second position;
applying an axial force, perpendicular to the base, to the space structure at features on the space structure engaged with contact points in the release mechanisms while the base moves from the first position towards the second position such that the space structure accelerates in a direction of the axial force when deploying the space structure; and
disengaging the features of the space structure from the contact points when at least one of decelerating of the base or reaching the second position by the base occurs.

18. The method of claim 17, wherein rotating the levers comprises:
rotating the levers with biasing devices to move the release mechanisms from the closed positions to the open positions when the base moves from the first position towards the second position such that the levers no longer secure the features to the contact points.

19. The method of claim 13, wherein at least one of tumbling of the space structure or shock applied to the space structure is reduced when the space structure is deployed.

20. The method of claim 13, wherein the space structure is selected from one of a satellite, a space station, and a spacecraft.

* * * * *

UNITED STATES PATENT AND TRADEMARK OFFICE
CERTIFICATE OF CORRECTION

PATENT NO. : 9,567,109 B2
APPLICATION NO. : 14/488902
DATED : February 14, 2017
INVENTOR(S) : Robles et al.

Page 1 of 1

It is certified that error appears in the above-identified patent and that said Letters Patent is hereby corrected as shown below:

In the Claims

Column 12, Line 63, change "substantially the same time" to -- substantially a same time --, Column 14, Line 20, change "level is a lever" to -- lever is a lever --.

Signed and Sealed this
Fourth Day of June, 2019

Andrei Iancu
*Director of the United States Patent and Trademark Office*